(12) United States Patent
Inoue et al.

(10) Patent No.: US 8,830,538 B2
(45) Date of Patent: Sep. 9, 2014

(54) ILLUMINATING DEVICE

(75) Inventors: Masaki Inoue, Hyogo (JP); Hiroshige Hata, Hyogo (JP); Kiyoyuki Kabuki, Hyogo (JP); Yutaka Shiozaki, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 251 days.

(21) Appl. No.: 12/926,120

(22) Filed: Oct. 27, 2010

(65) Prior Publication Data

US 2011/0102862 A1 May 5, 2011

(30) Foreign Application Priority Data

Nov. 4, 2009 (JP) ................. 2009-252952

(51) Int. Cl.
*H04N 1/04* (2006.01)
*H04N 1/028* (2006.01)

(52) U.S. Cl.
CPC ....... *H04N 1/02815* (2013.01); *H04N 1/02835* (2013.01); *H04N 1/02885* (2013.01)
USPC ........... 358/474; 382/135; 194/207; 194/206; 356/71

(58) Field of Classification Search
USPC ........................................ 358/474
See application file for complete search history.

(56) References Cited

U.S. PATENT DOCUMENTS

| 8,167,475 | B2 | 5/2012 | Katsumata et al. | |
| 2005/0150956 | A1* | 7/2005 | Ikeda et al. | 235/454 |
| 2005/0200917 | A1* | 9/2005 | Kanesaka et al. | 358/486 |
| 2009/0003784 | A1 | 1/2009 | Kabuki et al. | |
| 2009/0015883 | A1 | 1/2009 | Kim | |
| 2009/0052207 | A1* | 2/2009 | Chen et al. | 362/616 |
| 2009/0310192 | A1* | 12/2009 | Endo et al. | 358/474 |

FOREIGN PATENT DOCUMENTS

| JP | 2001-268320 A | 9/2001 |
| JP | 2006-067551 A | 3/2006 |
| JP | 2008-216409 A | 9/2008 |
| JP | 2009-022007 A | 1/2009 |
| WO | WO-2007/119290 A1 | 10/2007 |

OTHER PUBLICATIONS

Office Action issued in Japanese Patent Application No. 2009-252952, dated Oct. 2, 2013.

* cited by examiner

*Primary Examiner* — Barbara Reinier
*Assistant Examiner* — Brendan McCommas
(74) *Attorney, Agent, or Firm* — Rader, Fishman & Grauer PLLC (57) ABSTRACT

A illuminating device used for an document reading apparatus that has two rod shape light guides and light emitting elements where each of the light guides has a light emitting face and two flat light reflection faces, which may have a group of minute prisms that are formed along the longitudinal direction of the faces, and where light from each light emitting element is guided in the longitudinal direction by the light guide and reflected by that faces, such that the light is emitted from the light emitting face of each light guide and a virtual plane that is vertical to a longitudinal direction of each of the two light guides has two light intensity peaks.

2 Claims, 7 Drawing Sheets

Background Art

FIG. 14

Coordinates in Subscanning Direction

Background Art

ILLUMINATING DEVICE

CROSS-REFERENCES TO RELATED APPLICATION

This application claims priority from Japanese patent application Ser. No. 2009-252952 filed Nov. 4, 2009, the contents of which are incorporated herein by reference in their entirety.

TECHNICAL FIELD

The present invention relates to an illuminating device for reading information on a document, which is used for an apparatus such as a facsimile, a copying machine, and a scanner.

BACKGROUND

An apparatus, such as a facsimile, a copying machine, and a scanner, is equipped with a document reading apparatus, which reads characters and image information from a face of a document by light reflected from the document face. The document reading apparatus is equipped with an illuminating device, which illuminates the document face. Such an illuminating device comprises of two rod-shaped light guides, which are arranged to be aligned with each other, and light emitting elements, which are provided at an end face of each of the two light guides. The end faces, at which the light emitting element for one of the light guides and the light emitting element for the other light guide are arranged, face opposite directions (see Japanese Patent Application Publication No. 2001-268320).

Figure 13:
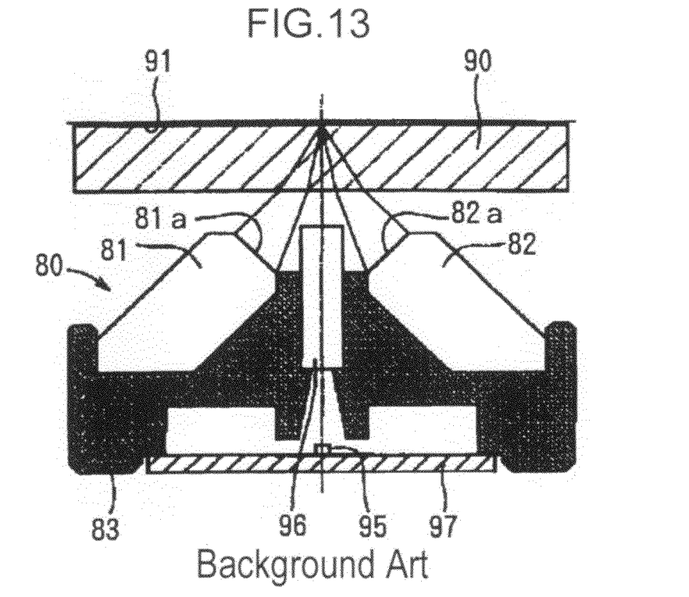
FIG. 13 is an explanatory cross sectional view showing the structure of a main part of an example of a document reading apparatus equipped with an illuminating device of the background art.

FIG. 13 is an explanatory cross sectional view of the structure of a main part of a document reading apparatus equipped with an illuminating device of the background art. In this figure, an illuminating device 80 has two rod shape light guides 81 and 82, which respectively extend in a main scanning direction (a direction perpendicular to the figure) and a chassis 83 for holding these light guides 81 and 82. A light emitting element (not shown in the figure) is arranged at one end face of the light guide 81, which is one of the two light guides 81 and 82 (for example, an end face in a near side of the figure), and another light emitting element (not shown in the figure) is arranged at the other end face of the other light guide 82, that is, an end face that faces in a direction opposite to the direction that the end face of the light guide 81 faces. The light guides 81 and 82 have light emitting faces 81a and 82a respectively. A platen 90 (contact glass), on which a document is placed, is provided above the illuminating device 80. A document having a document face 91 is placed on the document stand 90. A photoelectric conversion element 95 receives document reflection light, which is reflected from the document face 91, through a rod lens array 96. The photoelectric conversion element 95 is provided on the substrate 97.

In the illuminating device 80, the light emitted from the light emitting elements enters the light guides 81 and 82 from the end faces and is guided by the light guides 81 and 82 in the main scanning direction. When the light that is emitted from the light guides 81 and 82 irradiates the document face 91, a belt-like effective lighting area for reading the information of the document face, which extends in the main scanning direction, is formed on the document face 91, and the photoelectric conversion element 95 receives the document reflection light reflected from the effective lighting area of the document face 91 through the rod lens array 96. Character and image information in the document face are read by relatively moving the effective illumination area with respect to the document face 91 in a subscanning direction, that is, a direction perpendicular to a longitudinal direction of the light guides. Here, the effective illumination area is an illumination area, which receives 95% or more of a predetermined illuminance, which is, for example, the maximum illuminance. In the illuminating device, it is important that the effective illumination area has a certain width, which is required to read the information in the subscanning direction, for example, width of ±3 mm or more from the center position of the effective illumination area (6 mm as the width of the effective illumination area) and has high uniformity of irradiance distribution in the subscanning direction.

Therefore, it can be said that in the illuminating device 80 the light emitting elements are arranged at end faces of the two light guides, which face in opposite directions, so that the effective illumination area, which has high uniformity of irradiance distribution, can be obtained by superimposing light from the light guide 81 and the light guide 82, since the irradiance distribution of light emitted from the light guide 81 and that of light emitted from the light guide 82 are symmetrical on the document face. However, in the illuminating device 80, although it is possible to obtain the effective illumination area, which has high uniformity of irradiance distribution in the main scanning direction, it is difficult to obtain the effective illumination area, which has width required to read information on a document face in the subscanning direction, and which has high uniformity of irradiance distribution in the subscanning direction.

SUMMARY

This application relates to an illuminating device for illuminating a document surface. The device includes a first rod shaped light guide and a second rod shaped light guide that are respectively arranged to form a row. The row is substantially parallel to the document surface. The illuminating device further includes a first light emitting element and a second light emitting element arranged respectively at an end surface of the first and second light guides. The light guides have a light emitting face that is formed in a longitudinal direction and that has an outer circumference contour when viewed in a vertical cross sectional view taken perpendicularly to the longitudinal direction is an arc, a circle or a semi-circle. The light guides have two flat light reflection faces that are formed in a circumference face and that face the light emitting face. A group of minute prisms may be formed on each of the two flat light reflection faces along with the longitudinal direction. Light from each light emitting element is guided in the longitudinal direction by the light guide and reflected by each of the two flat light reflection faces such that the light is emitted from the light emitting face of each light guide. On a virtual plane that is vertical to a longitudinal direction of each of the light guides two light intensity peaks on the document face that are caused by light reflected by the two flat light reflection faces of each light guide are located in different sides of a document reading axis that is located at a center between the light guides and that is vertical to the document face. In other words, the center point that locates on the document reading axis also locates between the two light intensity peak positions.

On the virtual plane a distance from an intersection of the document face and the document reading axis to one of the two light intensity peak positions on the document face that is caused by light reflected by the two flat light reflection faces and that is caused by reflection light that intersects with the document reading axis may be shorter than a distance from the intersection of the document face and the document reading axis to the other light intensity peak position. In other words, a first light intensity peak position may be closer to the center point than a second light intensity peak position, wherein the first light intensity peak position is more distant from the light guide than the second light intensity peak position.

The light guides may be symmetrically arranged with respect to the document reading axis.

The illuminating device may further include a chassis that holds the light guides and that has a slit that transmits the light reflected from the document face.

BRIEF DESCRIPTION OF THE DRAWINGS

Other features and advantages of the present illuminating device will be apparent from the ensuing description, taken in conjunction with the accompanying drawings, in which.

DESCRIPTION

For the reasons set forth below, it is difficult to obtain the effective illumination area that has a width required to read information on a document face in the subscanning direction and has a high uniformity of irradiance distribution in the subscanning direction despite the possibility of obtaining a high uniformity of irradiance distribution in the main scanning direction,.

Figure 14:
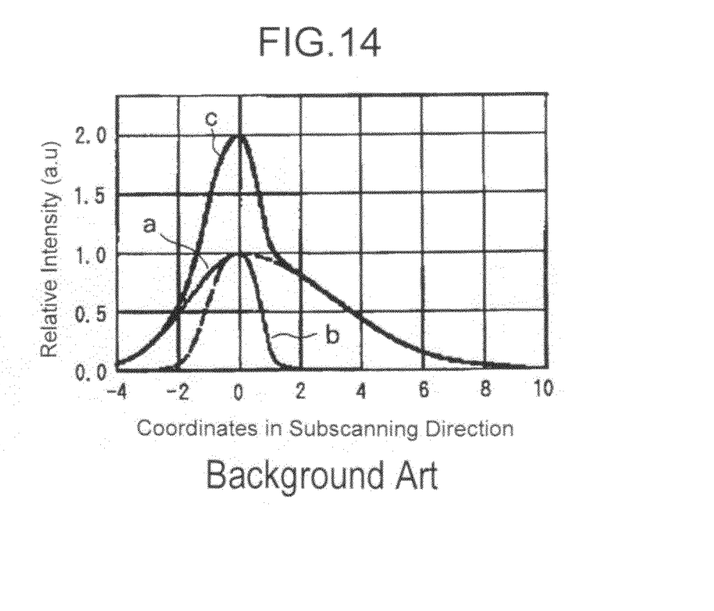
FIG. 14 is a graph of curve lines showing an irradiance distribution in a subscanning direction on a document face in an the illuminating device of the background art in the case where two light guides are arranged so that two light intensity peak positions are superimposed on each other on the document face.

FIG. 14 is a graph of characteristic curve lines showing the irradiance distribution in a subscanning direction of a document face in case where the light guides 81 and 82 are arranged so that the position of a peak in the intensity of light from the light guide 81 and that of light from the light guide 82 may overlap on the document face, in the conventional illuminating device. In the graph, a vertical axis shows relative intensity and a horizontal axis shows coordinates in subscanning direction. An irradiance distribution curve "a" shows a case of light emitted from one of the light guides. An irradiance distribution curve "b" shows a case of light emitted from the other light guide. An irradiance distribution curve "c" shows a case of light emitted from both of the two light guides. As FIG. 14 shows, when the two light guides are arranged so that the position of a peak in intensity of light from the light guides 81 and 82 may overlap on the document face and because the number of the peak positions is one in the subscanning direction on the effective illumination area so that the illuminance decreases as receding from the position of the peak in intensity of light, it is difficult to obtain the effective illumination area has a width required to read information on a document face in the subscanning direction.

From such a situation, it is possible to arrange the two light guides so that the position of a peak in intensity of light from one of the light guide and that of light from the other light guide are apart. In such a structure, since two light intensity peak positions are obtained from the respective two light guides if the light intensity of the light emitting elements that are respectively arranged for the two light guides is equivalent, it is possible to obtain the effective illumination area that has a width required for reading in the subscanning direction (refer to the irradiance distribution curvilinear a of FIG. 12). When there is a manufacturing tolerance in the light intensity of the light emitting elements, which are respectively arranged for the two light guides, and since the illuminance of one side becomes lower than that of the other side in the subscanning direction of the effective illumination area, the high uniformity of irradiance distribution cannot be obtained. Moreover, the drop of the illuminance of the other side is remarkable. Thus, it is difficult to obtain the effective illumination area, which has width required to read information on a document face in the subscanning direction (refer to the irradiance distribution curve line "b" of FIG. 12).

In view of the above situations, it is an object of the present invention to offer an illuminating device used for a document reading apparatus for reading light reflected from a document face, in which even if there is a manufacturing tolerance in light intensity of light emitting elements, which are arranged for respective two light guides, it is possible to obtain an effective illumination area that has a width required to read information on a document face in a subscanning direction and has high uniformity of irradiance distribution in the subscanning direction.

An illuminating device according to the present invention, which is used for an document reading apparatus to read light reflected from a document face, comprises of two rod shape light guides that are respectively arranged to form a row and light emitting elements arranged at an end surface of the light guide. Each light guide has a light emitting face, which is formed in a longitudinal direction, and an outer circumference contour in a vertical cross sectional view, taken perpendicularly to the longitudinal direction, is an arc of a circle. Each light guide has two flat light reflection faces that are formed in a circumference face and that face the light emitting face. A group of minute prisms is formed along with the longitudinal direction on each of the two flat light reflection faces of each light guide. Thus, light from each light emitting element is guided in the longitudinal direction by the light guide and reflected by each of the two flat light reflection faces, so that the light is emitted from the light emitting face of each light guide. On a virtual plane, vertical to a longitudinal direction of each of the two light guides, two light intensity peaks on the document face that are caused by light reflected by the two flat light reflection faces of each light guide are located in different sides of a document reading axis that is located at the center between the two light guides and that is vertical to the document face.

In the illuminating device according to the present invention, it may be desirable that on a virtual plane, vertical to a longitudinal direction of each of the two light guides, a distance from an intersection of the document face and the document reading axis to one of the two light intensity peak positions on the document face, which is caused by light reflected by the two flat light reflection faces and which is caused by reflection light that intersects with the document reading axis, be shorter than a distance from the intersection of the document face and the document reading axis to the other light intensity peak position. Moreover, in the illuminating device, it may be preferable that the two light guides be symmetrically arranged with respect to the document reading axis.

Moreover, in the illuminating device, it may be desirable to further include a chassis for holding the two light guides where a slit, which transmits the light reflected from the document face, is formed in the chassis.

In the illuminating device according to the present invention, since the two flat light reflection faces, on each of which a group of minute prisms are formed, are formed on the circumference face, which faces the light emitting face of each of the two light guides, the light from one of the light guides has two peaks in intensity of light, which is reflected light whose main component is light from either of the two flat light reflection surfaces, on a virtual plane that is vertical with respect to the longitudinal direction of the light guide. Further, since the two light intensity peak positions on the document face, which are caused by the reflected light, are located indifferent sides with respect to the document reading axis that is vertical to the document face located at the center between the two light guides and even if there is a manufacturing tolerance in light intensity of the light emitting elements arranged for the two light guides, it is possible to obtain the effective illumination area that has a width required for reading in the subscanning direction and has a high uniformity of irradiance distribution in the subscanning direction, since, on the document face, light from the light guides are superimposed on and to compensate for each other.

Figure 1:
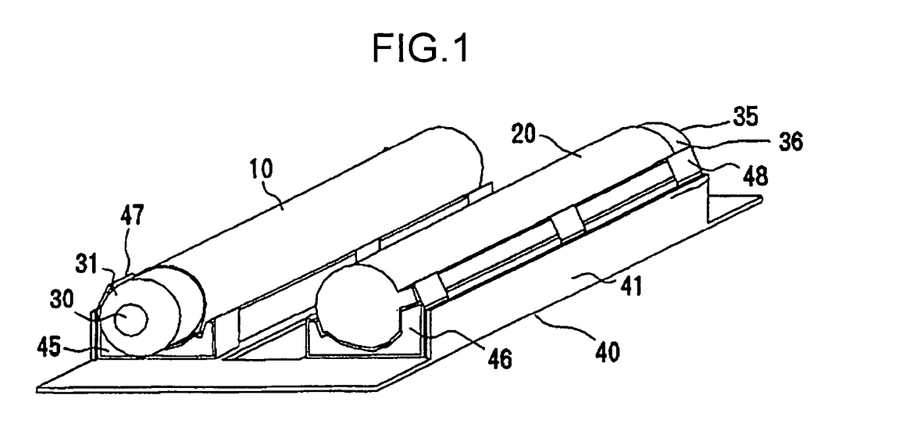
FIG. 1 is a perspective view of an example of an illuminating device according to the present invention.
Figure 2:
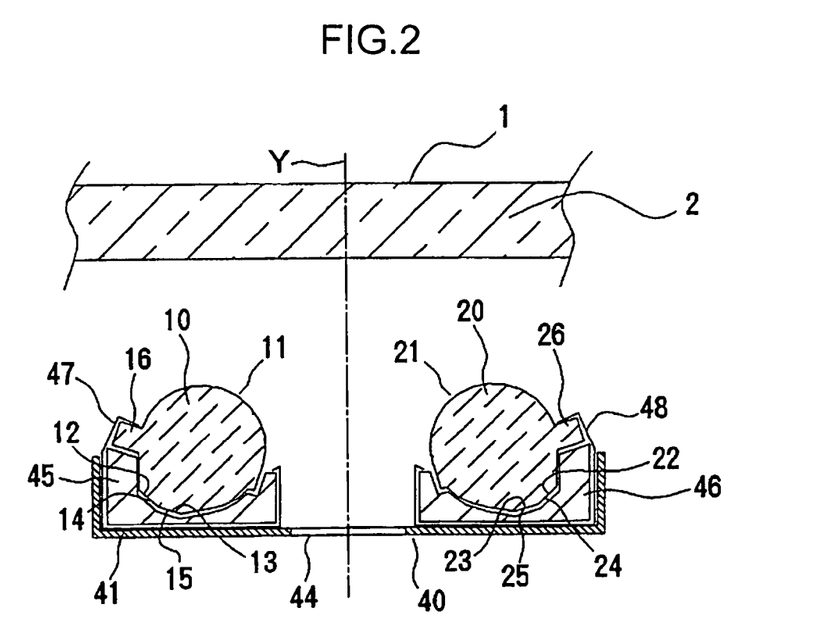
FIG. 2 is an explanatory cross sectional view of the structure of the illuminating device shown in FIG. 1, which is installed in a document reading apparatus, taken along a subscanning direction.
Figure 3A:
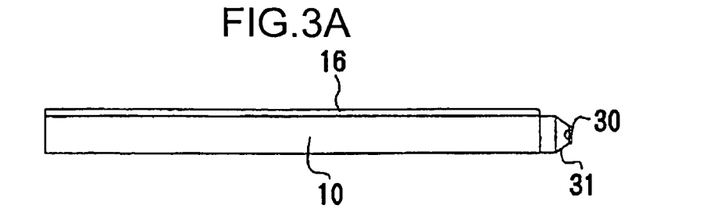
FIG. 3 is an explanatory diagram showing arrangement relation of two light emitting elements and two light guides.
Figure 3B:
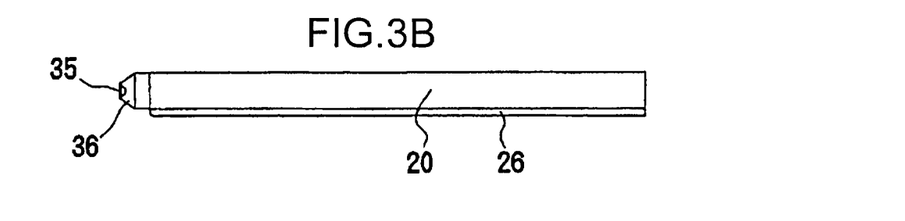

Description of an embodiment of an illuminating device according to the present invention will be given below. FIG. 1 is a perspective view of an example of an illuminating device according to the present invention. FIG. 2 is an explanatory cross sectional view of the structure of the illuminating device shown in FIG. 1, which is installed in a document reading apparatus, taken along a subscanning direction. The illuminating device is arranged under a transparent platen 2, on which a document is placed. As shown in FIG. 3, the illuminating device has two rod-shaped light guides 10 and 20, which are arranged to extend in a main scanning direction and in parallel to be apart from each other along a plane surface, which is parallel to a document face 1. In the example shown in the figures, two light guides 10 and 20 have substantially the same shape, and are symmetrically arranged with respect to a document reading axis Y that is perpendicular to the document face 1 of the document, which is located in the center between the light guides 10 and 20 and is running in the same distance from the light guides 10 and 20. In the present invention, the "subscanning direction" means a direction in which the illuminating device is moved relatively with respect to the document face, and the "main scanning direction" means a direction that is perpendicular to the subscanning direction, and parallel to the document face. A light emitting element 30 is arranged at one end face of the light guide 10, which is one of the two light guides 10 and 20, so as to be apart from the one end face of the light guide 10. A mirror 31 is arranged so as to surround a space between the one end face of the light guide 10 and the light emitting element 30. A light emitting element 35 is arranged at the other end face of the other light guide 20, which face a direction opposite to that of the one end face of the light guide 10, so as to apart from the other end face of the light guide 20. A mirror 36 is arranged so as to surround a space between the other end face of the light guide 20 and the light emitting element 35.

Figure 4:
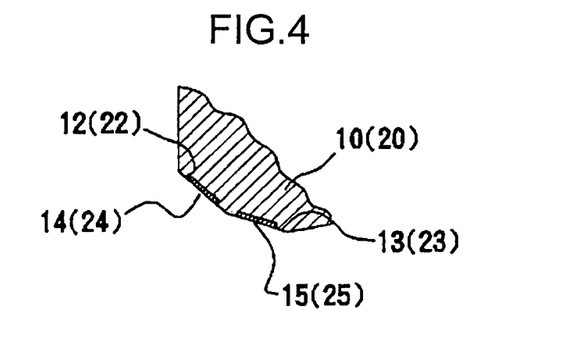
FIG. 4 is an enlarged and explanatory cross sectional view of part of a light guide.

Light emitting faces 11 and 21, each having a circular circumference contour when viewed in a cross section taken perpendicular to a longitudinal direction, are formed on the respective light guides 10 and 20 along a longitudinal direction of the light guides 10 and 20. As shown in FIG. 4 which is an enlarged view of part of the light guide, two flat light reflection faces 12 and 13 (22 and 23) are formed on the circumference face that faces the light emitting face 11 (21). A groups of minute prism 14, 15 (24, 25) for reflecting light that enters the light guide 10 (20) from the light emitting element 30 (35) toward the light emitting face are formed on each of the two flat light reflection faces 12 and 13 (22 and 23) of the light guide 10 (20), along the longitudinal direction of the light guide 10 (20).

Each of the two light guides 10 and 20 is held by a common chassis 40. Specifically, the chassis 40 has a base member 41, two long holding stands 45 and 46 that extend apart from each other and in parallel to each other on the base member 41 and guide fixing claws 47 and 48 respectively held between the base member 41 and the holding stands 45 and 46. On the other hand, a holding ridge portion 16 (26), which extends in the longitudinal direction of the light guide 10 (20), is formed on the light guide 10 (20) between the light emitting face 11 (21) and the one flat light reflection face 12 (22). Since the holding ridge portion 16 (26) of the light guide 10 (20) is fixed by the guide fixing claw 47 (48) of the chassis 40, the light guide 10 (20) is held by the holding stand 45 (46) in a state where the light emitting face 11 (21) faces predetermined directions. Moreover, a slit 44, which transmits reflection light from the document, is formed in the base member 41 of the chassis 40 between the two holding stands 45 and 46 so as to extend in the same direction as that of the holding stands 45 and 46.

Polymethyl methacrylate resin, a cycloolefin polymer, a cycloolefin copolymer, or the like maybe used as the material that forms the light guides 10 and 20. By using such a material, the light guides 10 and 20 can be made by an injection molding method. Moreover, each group of the minute prisms 14, 15, 24, and 25 may be integrally formed on the respective flat light reflection faces 12, 13, 22, and 23 of the light guides 10 and 20, or each group of the minute prisms 14, 15, 24, and 25, which is made up of a member (s) separated from the flat light reflection face, may be provided on the flat light reflection faces 12, 13, 22, and 23. In the case where the groups of minute prism groups 14, 15, 24, and 25, which are made up of a separate member(s), is used, the light guides 10 and 20 can be made in an injection molding method by using the same material as that of the light guides 10 and 20. As to dimension of the light guides 10 and 20, for example, the light guides 10 and 20 are 340 mm in full length, respectively. A radius of an arc, which forms a light emission portion 11 (21), is 2.5 mm. The width of each of the flat light reflection faces 12, 13, 22 or 23 is 1.0 mm.

White LEDs may be used as the light emitting elements 30 and 35. Moreover, metal material such as aluminum, may be used as material, which forms the base member 41 of the chassis 40. Metal material, such as aluminum, and resin material, such as polycarbonate resin, may be used as the material that forms the holding stands 45 and 46.

Figure 5:
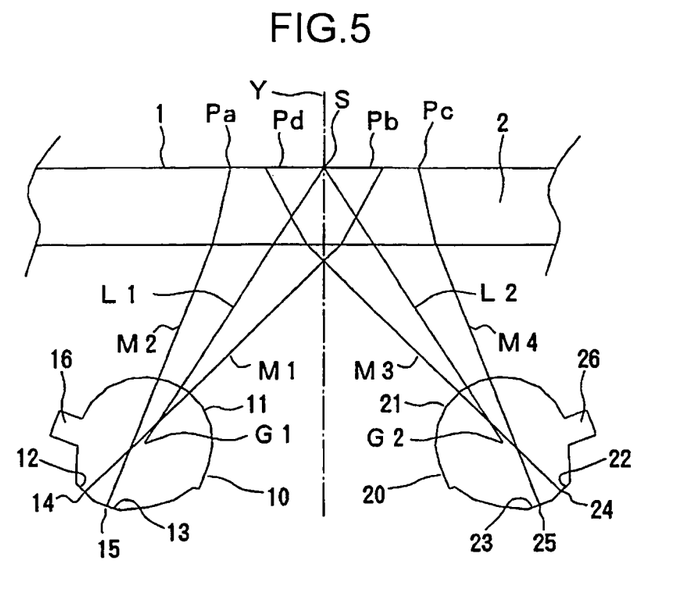
FIG. 5 is an explanatory diagram showing the physical relationship between a light intensity peak positions that are caused by two light guide, and a document reading axis on a document face.

In the illuminating device, the light emitted from the light emitting elements 30 and 35 is respectively reflected by the mirrors 31 and 36, and guided to be incident on the respective end faces of the light guides 10 and 20. The light is further reflected on the circumferential faces of these light guides 10 and 20 and guided in the longitudinal direction of the light guides 10 and 20. The light is reflected by each of two flat light reflection faces 12 and 13 (22 and 23) and is emitted from the light emitting faces 11 and 21 of the light guides 10 and 20, so that the document face 1 of the document placed on the platen 2 is irradiated. At this time, as shown in FIG. 5, on the document face 1, there are two peak positions Pa and Pb in intensity of light emitted from the two flat light reflection faces 12 and 13 of the one light guide 10 and two peak positions Pc and Pd in intensity of light emitted from the two flat light reflection faces 22 and 23 of the other light guide 20. Therefore, in the illuminating device according to the present invention, when a virtual plane, which is vertical with respect to the longitudinal direction of the two light guides 10 and 20, is viewed, the light intensity peak position Pa on the document face, which is caused by the light reflected by the flat light reflection face 13 of the one light guide 10, is located in a side opposite to a side of the light intensity peak position Pb, which is caused by the light reflected by the flat light reflection face 12, with respect to the document reading axis Y, which is vertical to the document face 1 and which is located at the center between the light guide 10 and 20 The light intensity peak position Pc on the document face, which is caused by the light reflected by the flat light reflection face 23 of one light guide 20, is located in a side opposite to a side of the light intensity peak position Pd, which is caused by the light reflected by the flat light reflection face 22, with respect to the document reading axis Y.

In the example shown in the figures, on the virtual plane, which is vertical to the longitudinal direction of the two light guides 10 and 20, when a virtual straight line, which passes through an intersection center point S of the document reading axis Y and the document surface 1 and a center G1, is expressed as L1, and a virtual straight line, which passes through the intersection center point S of the document reading axis Y and the document face 1 and a center G2, is expressed as L2, ray axes M1 and M2, which come from the respective center positions in width directions of the minute prism groups 14 and 15 of one light guide 10, intersect with the virtual straight line L1, and ray axes M3 and M4, which come from the respective center positions in width directions of the minute prism groups 24 and 25 of the other light guide 20, intersect with the virtual straight line L2. Since the ray axes M1, M2, M3, and M4 do not pass through the centers G1 and G2 of the arcs of the light emitting faces 11 and 21 of the light guides 10 and 20, when the ray axes M1, M2, M3, and M4 intersect with the light emitting faces 11 and 21, respectively, their directions change by refraction. However, in the diagrams, they are shown as straight lines for convenience. Moreover, the ray axis M1 from the center position in the width direction of the minute prism group 14, which is one of the two minute prism groups 14 and 15 of the one light guide 10 and is located in an outside of the minute prism 15 with respect to the document reading axis Y, intersects with the document reading axis Y. The ray axis M3 from the center position in the width direction in the minute prism group 24, which is one of the two minute prism groups 24 and 25 of the other light guide 20 and is located in an outside of the minute prism 25 with respect to the document reading axis Y, intersects with the document reading axis Y.

Moreover, in the illuminating device according to the present invention, it is desirable that, in a virtual plane surface perpendicular to each longitudinal direction of the two light guides 10 and 20, a distance from the intersection center point S of the document face 1 and the document reading axis Y to the light intensity peak position Pb, which is one of the light intensity peak positions Pa and Pb on the document face 1 caused by light reflected by the two flat light reflection faces 12 and 13 of the one light guide 10 and is caused by the reflected light intersecting with the document reading axis Y, be shorter than a distance from the intersection center point S of the document face 1 and the document reading axis Y to the other light intensity peak position Pa. Further, it is desirable that, in a virtual plane surface perpendicular to each longitudinal direction of the two light guides 10 and 20, a distance from the intersection center point S of the document face 1 and the document reading axis Y, to the light intensity peak position Pd, which is one of the light intensity peak positions Pc and Pd on the document face 1 caused by light reflected by the two flat light reflection faces 22 and 23 of the one light guide 20 and is caused by the reflected light intersecting with the document reading axis Y, be shorter than a distance from the intersection center point S of the document face 1 and the document reading axis Y to the other light intensity peak position Pc. In other words, the light intensity peak position Pb is closer to the center point S than the light intensity peak position Pa, whereas the intensity peak position Pb is more distant from the light guide 10 than the light intensity peak position Pa. The light intensity peak position Pd is closer to the center point S than the light intensity peak position Pc, whereas the intensity peak position Pd is more distant from the light guide 20 than the light intensity peak position Pc. According to such a structure, it is possible to obtain an effective illumination area, which has higher uniformity of irradiance distribution in the subscanning direction.

According to the illuminating device of the present invention, the two flat light reflection faces 12 and 13 on which the minute prism groups 14 and 15 are formed and the two flat light reflection faces 22 and 23 on which the minute prism groups 24 and 25 are formed are formed on the respective circumference faces, which respectively face the light emitting face 11 of the light guide 10 and the light emitting face 21 of the light guide 20. Therefore, as is also clear from an embodiment described below, on the virtual plane, which is vertical with respect to the longitudinal direction of the light guides 10 and 20, while light from the one light guides 10 has two light intensity peaks that are caused by the reflected light whose main component is either the light from the flat light reflection surface 12 or that from the flat light reflection surface 13, and an approximately flat distribution that is followed by one of the light intensity peaks, the light from the other light guide 20 also has two light intensity peaks whose main component is light reflected by the two flat light reflection surfaces 12 and 13 and an approximately flat distribution which is followed by one of light intensity peaks (refer to FIGS. 7 and 8). Furthermore, while the two light intensity peak positions Pa and Pb on the document face, which are caused by the light reflected by two flat light reflection faces 12 and 13 of the one light guide 10, are located in different sides of the document reading axis Y, two light intensity peak positions Pc and Pd on the document face, which are caused by light reflected by the two flat light reflection faces 22 and 23 of the other light guide 20, are located on different sides of the document reading axis Y. Thus, even if there is a manufacturing tolerance in light intensity of the light emitting elements 30 and 35 that are arranged for the respective two light guides 10 and 20, since light from one of the light guides 10 and that from the other light guide 20 are superimposed on each other on the document face 1 to compensate each other, it is possible to obtain the effective illumination area that has width required for reading in the subscanning direction and that has, high uniformity of irradiance distribution in the subscanning direction.

Figure 6:
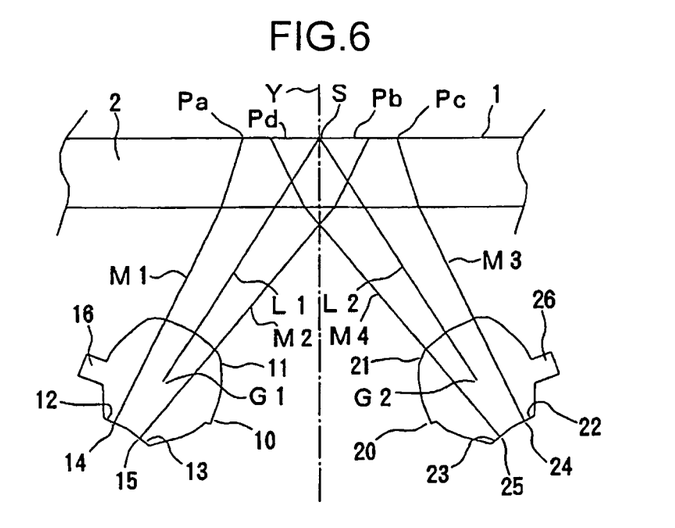
FIG. 6 is an explanatory cross sectional view of the structure of an illuminating device according to the present invention, which is installed in a document reading apparatus, taken along a subscanning direction.

The illuminating device according to the present invention is not limited to the above-mentioned embodiments, and various changes can be made thereto. For example, as shown in FIG. 6, by changing the inclinations of the flat light reflection faces 12 and 13 and the flat light reflection faces 22 and 23 of the respective light guides 10 and 20 with respect to a document face, the ray axis M2 from a position located at the center in the width direction of the minute prism group 15, which is one of the two minute prism groups 14 and 15 of the one light guide 10 and is located in an inward side of the minute prism group 14 with respect to the document reading axis Y, may intersect with the document reading axis Y Further, the ray axis M4 from a position located at the center in the width direction in the minute prism group 25, which is one of the two minute prism groups 24 and 25 of the other light guide 20, and which is located in an inward side of the minute prism group 24 with respect to the document reading axis Y, may intersect with the document reading axis Y.

Embodiments

EXPERIMENTAL EXAMPLE 1

Figure 7:
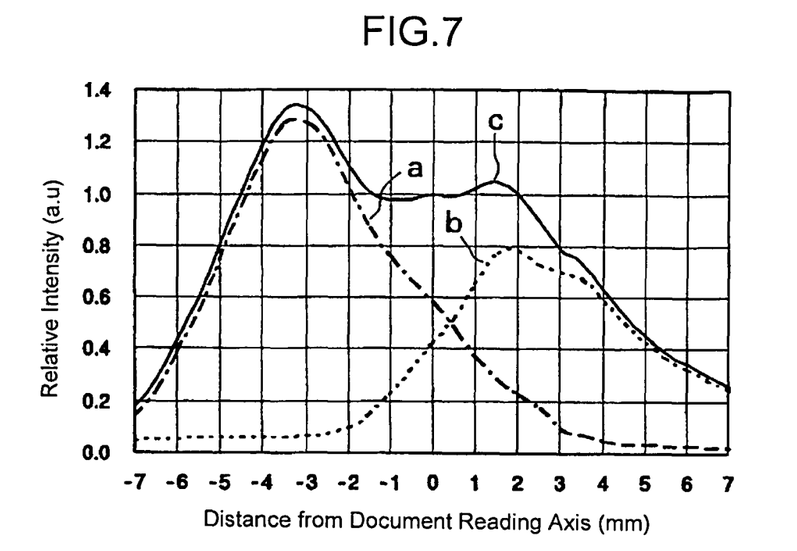
FIG. 7 is a graph of curve lines showing the irradiance distribution of light from one of light guides in a subscanning direction, in an experimental example 1.
Figure 8:
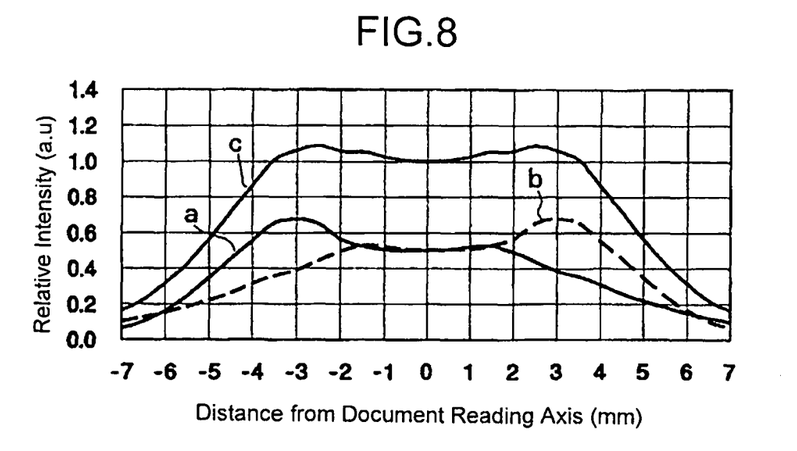
FIG. 8 is a graph of curve lines showing the irradiance distribution of light from two light guides in a subscanning direction.

An illuminating device A1 having two light guides was made according to the structure shown in FIG. 2, using white LEDs with equal light intensity, as the light emitting elements, wherein the full length of each light guide was 340 mm, the radius of an arc, which formed each light emitting face was 2.5 mm, the width of each flat light reflection face was 1.0 mm, and an angle formed by the two flat light reflection faces of each light guide was respectively 24 degrees. The illuminating device A1 irradiated a document face from a distance of 8.0 mm in a direction perpendicular to each light guide with light, and an irradiance distribution in the subscanning direction was measured. FIG. 7 is a graph of curve lines showing an irradiance distribution in a subscanning direction in the case where the light was emitted from one light guide. In the figure, a vertical axis shows relative intensity and a horizontal axis shows the distance from a document reading axis, wherein "a" shows an irradiance distribution curve in case where reflected light is emitted from one flat light reflection face, "b" shows an irradiance distribution curve in case where reflected light is emitted from the other flat light reflection face, and "c" shows an irradiance distribution curve in case where light is emitted from the light guides, as a whole. In FIG. 7, the light, which was emitted from the one light guide had two light intensity peaks and an approximately flat distribution was followed by one of the light intensity peaks The two light intensity peak positions on the document face were located in sides of the document reading axis Y, which are different from each other. FIG. 8 is a graph of a characteristic curve lines showing an irradiance distribution in a subscanning direction in which the light was emitted from the two light guides. In the figure, a vertical axis is relative intensity and a horizontal axis is the distance from a document reading axis, wherein "a" shows an irradiance distribution curve in case where the light was emitted from one light guide, "b" shows an irradiance distribution curve, in case where the light was emitted from the other light guide, and "c" shows an irradiance distribution curve, in case where the light was emitted from the two light guides. In FIG. 8, a required illuminance was obtained in the range of ±3 mm or more from the document reading axis by the light from the two light guides in the subscanning direction. Thus, it was possible to obtain high uniformity of irradiance distribution in the above area.

EXPERIMENTAL EXAMPLE 2

Figure 9:
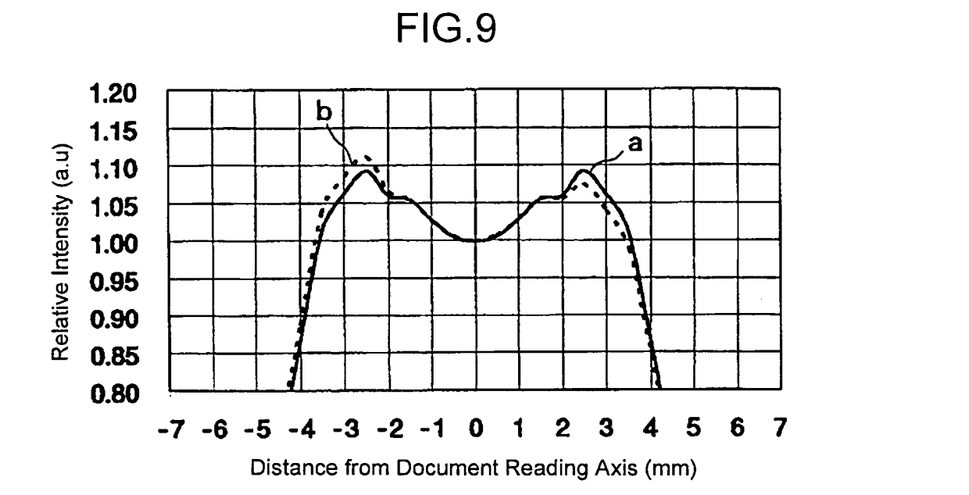
FIG. 9 is a graph of curve lines showing the irradiance distribution in a subscanning direction that is caused by an illuminating device in experimental examples 1 and 2.

An illuminating device A2, was prepared, in which the specification was the same as that of the illuminating device A1 except that the intensity of a light emitting element (white LED) arranged for one light guide was 15% lower than that of a light emitting element (white LED) arranged for the other light guide. This illuminating device A2 irradiated a document face with light, from a distance of 8.0 mm in a direction perpendicular to each light guide, and an irradiance distribution in the subscanning direction was measured. The result is shown in FIG. 9. In FIG. 9, a vertical axis shows relative intensity and a horizontal axis shows the distance from a document reading axis. "a" is an irradiance distribution curve, in the case of the illuminating device A1, which uses two light emitting elements (white LEDs) with equivalent light intensity. "b" is an irradiance distribution curve in the case where the illuminating device A2, in which the light intensity of the light emitting element was offset by 15%. Thus, even though there was a manufacturing tolerance in these light emitting elements that were arranged for the respective two light guides, it was possible to acquire a required illuminance in a range of ±3 mm or more from the document reading axis in the scanning direction, and it is possible to obtain high uniformity of irradiance distribution in the above area.

COMPARATIVE EXPERIMENTAL EXAMPLE 1

Figure 10:
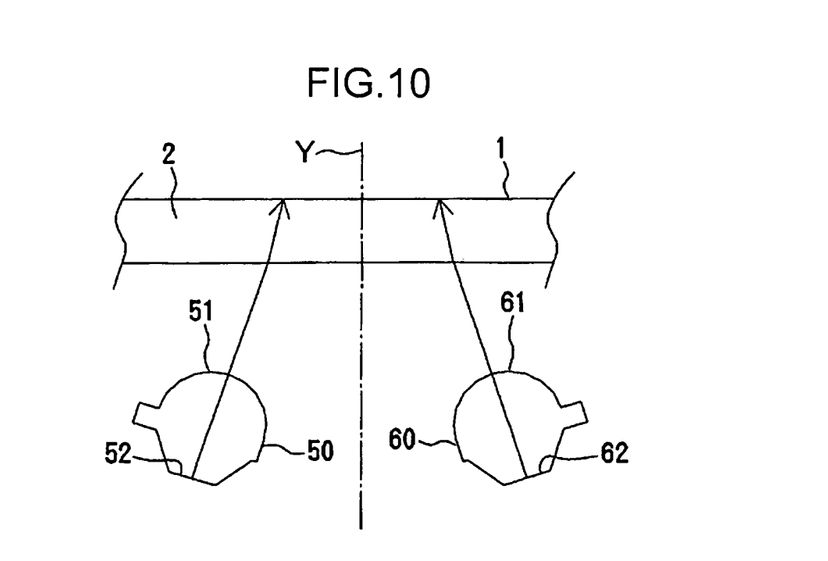
FIG. 10 is an explanatory cross sectional view of the structure of an illuminating device according to a comparative experiment example 1, taken along a subscanning direction.
Figure 11:
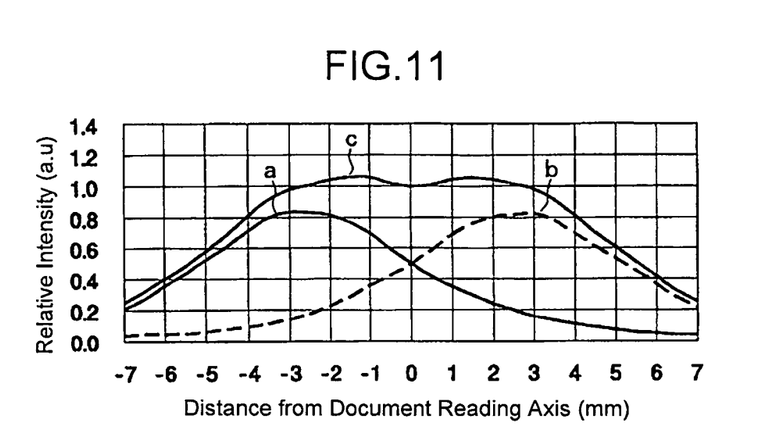
FIG. 11 is a graph of curve lines showing an irradiance distribution that is caused by an illuminating device B1, according to a comparative experiment example 1.
Figure 12:
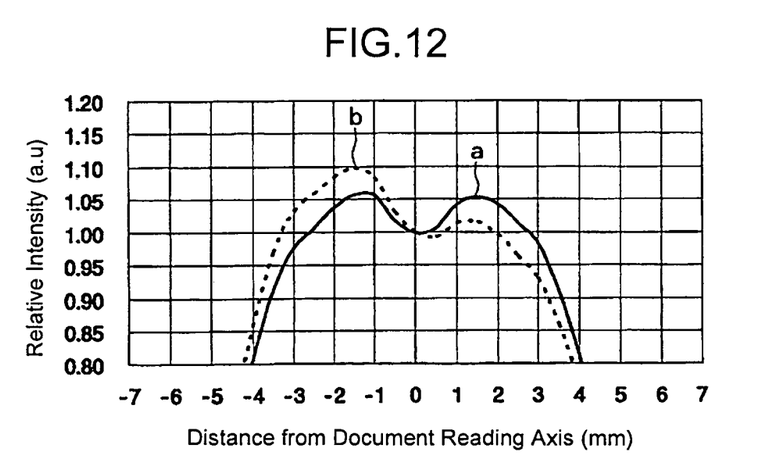
FIG. 12 is a graph of curve lines showing an irradiance distribution that is caused by an illuminating device B1) and an illuminating device (B2, according to a comparative experiment example 1.

An illuminating device B1 was made according to the structure shown in FIG. 10, having light guides 50, 60 and using white LEDs with equal light intensity, as the light emitting elements. Flat light reflection faces 52, 62 were formed on the respective circumference faces of light guide 50, 60 to face the respective light emitting faces 51, 61. The full length of each light guide 50, 60 was 840 mm, the radius of an arc that formed the light emitting face 51, 61 was 2.5 mm, and the width of the flat light reflection face 52, 62 was 1.8 mm. When the illuminating device B1 irradiated a document face with light from a distance of 8.0 mm in a direction perpendicular to each light guide an irradiance distribution in the subscanning direction was measured. A result is shown in FIG. 11. Moreover, an illuminating device B2, was prepared, in which the specification was the same as that of the illuminating device B1 except that the intensity of a light emitting element (white LED) arranged for one light guide was 15% lower than that of a light emitting element (white LED) arranged for the other light guide. When the illuminating device B2 irradiated a document face with light from a distance of 8.0 mm in a direction perpendicular to each light guide, an irradiance distribution in the subscanning direction was measured. A result is shown in FIG. 12. In FIG. 11, a vertical axis shows relative intensity and a horizontal axis shows the distance from a document reading axis. "a" is an irradiance distribution curve in the case where light was emitted from one light guide. "b" is an irradiance distribution curve in the case where the light was emitted from the other light guide. "c" is an irradiance distribution curve in the case where the light was emitted from two light guides. Moreover, in FIG. 12, a vertical axis shows a relative intensity and a horizontal axis shows the distance from a document reading axis. "a" shows an irradiance distribution curve for illuminating device B1, and "b" is an irradiance distribution curve for the illuminating device B2. As is clear from FIG. 11, in the case where the light intensities of the light emitting elements that were arranged for the respective two guides were equal, although it is possible to obtain high uniformity of irradiance distribution in the subscanning direction, in the case where, there was a manufacturing variation in the light intensity of the light emitting elements, which were respectively arranged for two light guides, a required illuminance could not obtained in the range of ±3 mm or more from a document reading axis by the light from two light guides in the subscanning direction, and further, high uniformity of irradiance distribution in the above area could not be obtained.

The preceding description has been presented only to illustrate and describe exemplary embodiments. It is not intended to be exhaustive or to limit the invention to any precise form disclosed. It will be understood by those skilled in the art that various changes may be made and equivalents may be substituted for the elements without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An illuminating device that illuminates a document disposed on a document surface plane of a platen, the document extending in a main scanning direction defined as to and between one side edge of the document and an opposing side edge of the document extending parallel to the one side edge and a subscanning direction defined as to and between a top edge of the document and an opposing bottom edge of the document extending parallel to the top edge, the subscanning direction being perpendicular to the main scanning direction, the document having a document reading axis extending thereacross to and between the one side edge and the opposing side edge in the main scanning direction and positioned between and extending parallel to the top edge and the opposing bottom edge with a reference plane extending through the document reading axis and perpendicularly to the main scanning direction and the subscanning direction, the illuminating device comprising:

a first rod shaped light guide extending in the main scanning direction and a second rod shaped light guide disposed apart from the first rod shaped light guide in a facially opposing manner and extending parallel thereto, the first and second rod shaped light guides disposed on opposing sides of the reference plane and equidistantly therefrom, each one of the first and second rod shaped light guides includes a first light reflection face and a second light reflection face extending thereacross, the first and second light reflection faces being oriented angularly relative to each other as viewed in cross-section at an angle being either greater than 180 degrees or less than 180 degrees, wherein light is reflected by the first and second flat light reflection faces of each one of the first and second rod shaped light guides such that the light is emitted therefrom onto a document surface of the document to form first and second light intensity peak positions thereon from the first rod shaped light guide and third and fourth light intensity peak positions thereon from the second rod shaped light guide, wherein the first and second light intensity peak positions are disposed on opposite sides of the document reading axis and the third and fourth light intensity peak positions are disposed on opposite sides of the document reading axis with the first and third light intensity peak positions being on a top edge side of the document reading axis while the second and fourth peak positions are disposed on a bottom edge side of the document reading axis, wherein the second light intensity peak position is disposed closer to the document reading axis than the first light intensity peak position and wherein the fourth light intensity peak position is disposed closer to the document reading axis than the third light intensity peak position.

2. The illuminating device according to claim 1, further comprising a first light emitting element operably connected to the first rod shaped light guide adjacent the one side edge of the document and a second light emitting element operably connected to the second rod shaped light guide adjacent the opposing side edge of the document.

* * * * *